2 Sheets—Sheet 1.

W. H. SEYMOUR.
MOWING-MACHINE.

No. 175,511.  Patented March 28, 1876.

WITNESSES
Wm A Skinkle
F. Stüb

INVENTOR
William H Seymour
By his Attorney
Wm D Baldwin

2 Sheets—Sheet 2.

W. H. SEYMOUR.
MOWING-MACHINE.

No. 175,511. Patented March 28, 1876.

WITNESSES
Wm A Skinkle
J. Fitch

INVENTOR
William H Seymour.

By his Attorney
Wm D. Baldwin

UNITED STATES PATENT OFFICE.

WILLIAM H. SEYMOUR, OF BROCKPORT, NEW YORK, ASSIGNOR TO DAYTON S. MORGAN, OF SAME PLACE.

IMPROVEMENT IN MOWING-MACHINES.

Specification forming part of Letters Patent No. 175,511, dated March 28, 1876; application filed February 12, 1876.

*To all whom it may concern:*

Be it known that I, WILLIAM H. SEYMOUR, of Brockport, in the county of Monroe and State of New York, have invented certain new and useful Improvements in Mowing-Machines, of which the following is a specification:

My invention relates to that class of two-wheeled, hinge-joint mowing-machines having the cutting apparatus in the line of the driving-wheel, and constitutes an improvement on Letters Patent No. 97,126, granted to me November 23, 1869.

The subject-matter claimed hereinafter specifically will be designated.

Figure 1:
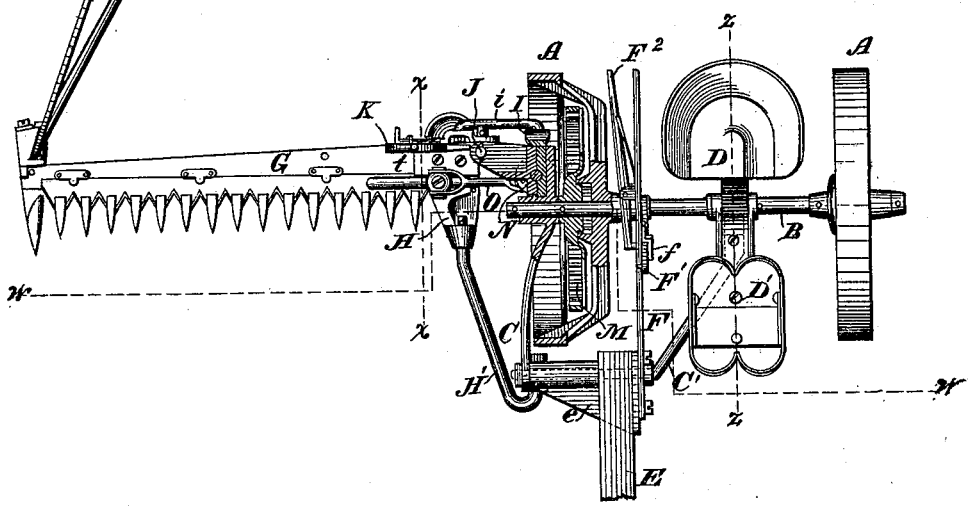
Figure 2:
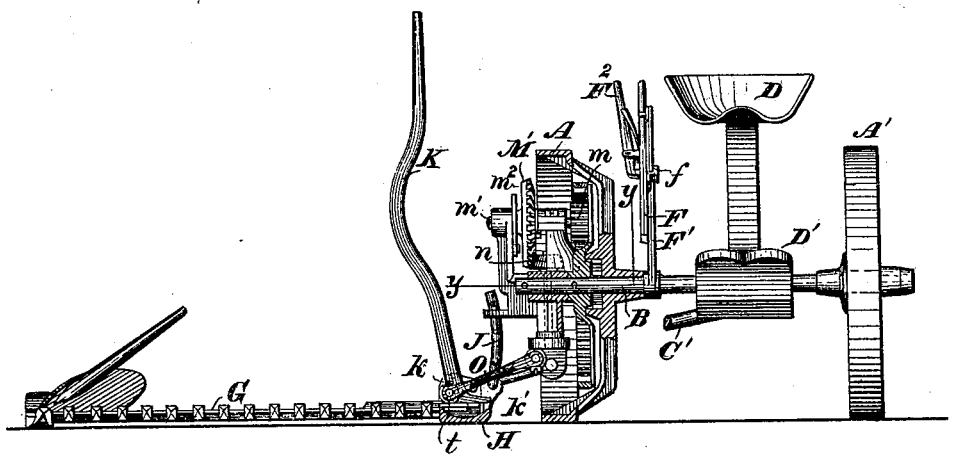
Figure 3:
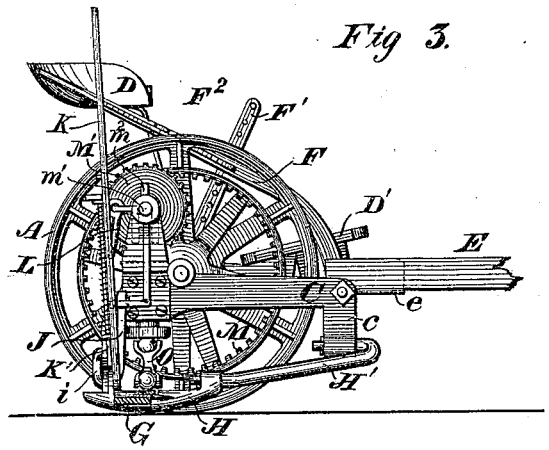
Figure 4:
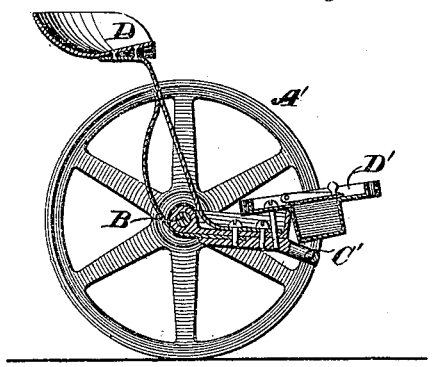

In the accompanying drawings, Figure 1 represents a plan or top view of my improved mower, partly in section, on the line $y\ y$ of Fig. 2. Fig. 2 represents a front view thereof, partly in section, on the line $w\ w$ of Fig. 1; Fig. 3, a side elevation, partly in section, on the line $x\ x$ of Fig. 1; and Fig. 4, a vertical longitudinal section on the line $v\ v$ of Fig. 1.

Two driving-wheels, A A', turn loosely upon a main axle, B, with which they are connected by backing-ratchets, as usual. The inner drive-wheel A is made dish-shaped, in order that it may surround the driving-gearing. The main frame consists of a bar, C, outside of the driving-wheel, and of a bent rod, C', both provided with bearings, in which the main axle revolves. The driver's seat D and foot-board D', the latter of which also constitutes the tool-box, are mounted on the bar C'. A tongue, E, is bolted to a tongue-plate, $e$, pivoted to rock on the bar C' of the frame. A rocking-lever, F, secured rigidly to the rear end of the tongue, extends backward within convenient reach of the driver when on his seat, and is provided with an eye, $f$, movable freely endwise on a rocking post, F¹, pivoted on the main axle. The lever is locked at any desired elevation by means of the usual spring-detent F².

By the construction above described the machine has three fulcra—the neck-yoke of the horses, the bar C', and the main axle.

When suspended from the neck-yoke the machine is raised and lowered by the flexure of a central joint—that is, the bar C'—which rises and falls as the machine is rocked, which adjustment also tips the cutting apparatus.

The finger-beam G is secured to a shoe, H, the toe of which is attached by a swivel-joint to a drag-bar, H', connected by a swivel-joint to a down-hanger, $c$, on the frame-piece C, below the bar C'. The rear end of the shoe is connected by a link, $i$, to a down-hanger, I, from the frame-bar C. The cutting apparatus is thus free to rise and fall at either end without affecting the motions of the main frame.

A link, J, pivoted to a lug on the shoe, moves endwise through a bracket on the frame, and is provided with an adjustable stop, by which it may be prevented from descending below a given point, or the shoe may be held above the ground for transportation. The stop shown consists of a pin taking into a series of holes in the link; but other well-known equivalent devices may be used, if preferred.

The divider end of the finger-beam can be raised or lowered by means of a lever, K, rocking in a vertical path, parallel with the finger-beam, and a pivot, $k$, at the back of the shoe. The lever is free to flex outward, but is prevented from flexing inward beyond a vertical line by a toe, $k'$, on the lever, and is normally held locked in a vertical position by a spring-detent, $k'$.

The finger-beam, when turned up toward the main frame, may be locked by a hook or link, L, in well-known ways.

An internal spur-gear, M, fast upon the main axle, and independent of the driving-wheel, which incloses it, drives a spur-pinion, $m$, on a counter-shaft, $m^1$, carrying a bevel-gear, M', driving a corresponding pinion, $n$, on a vertical crank-shaft, N. The mechanism is thrown into and out of gear by sliding the counter-shaft endwise in its bearings, it being locked in gear by a clutch-yoke, $m^2$. The pitman O is forked at each end, and rocks on horizontal pivots in a ball turning on the crank-pin, and a stud, $t$, on the cutter-bar, respectively, so as to give great freedom of motion.

The cutting apparatus is of the usual well-known construction.

I claim as of my own invention—

1. The combination of the main axle, the driving-wheels, the frame C outside of the wheels, the bar C', connected to the bar C and to the main axle, the tongue pivoted on the bar C', the rocking lever fixed on the tongue, and the rocking guide-post of said lever, mounted on the main axle, these members being constructed and operating as hereinbefore set forth.

2. The combination of the frame-bars C C', the tongue pivoted on the bar C', the cutting apparatus arranged within a cylinder projected from the periphery of the driving-wheels, the drag-bar swiveled to the front of the frame-bar below the line of the joint, and the double-hinged coupling-arm, these members being constructed and operating as hereinbefore set forth.

3. The combination of the shoe, the lifting-lever pivoted thereon, its toe, and locking-detent, these members being constructed and operating as set forth.

In testimony whereof I have hereunto subscribed my name.

WM. H. SEYMOUR.

Witnesses:
JOHN H. KINGSBURY,
E. T. LAMB.